(12) United States Patent
Chen et al.

(10) Patent No.: US 7,602,879 B2
(45) Date of Patent: Oct. 13, 2009

(54) METHOD FOR INCREASING THE RESOLUTION OF A CT IMAGE DURING IMAGE RECONSTRUCTION

(75) Inventors: Guang-Hong Chen, Madison, WI (US); Jiang Hsieh, Brookfield, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 249 days.

(21) Appl. No.: 11/535,657

(22) Filed: Sep. 27, 2006

(65) Prior Publication Data

US 2007/0098133 A1  May 3, 2007

Related U.S. Application Data

(60) Provisional application No. 60/732,753, filed on Nov. 2, 2005.

(51) Int. Cl.
*A61B 6/00* (2006.01)
(52) U.S. Cl. ........................................................ 378/4
(58) Field of Classification Search ...................... 378/4
See application file for complete search history.

(56) References Cited

U.S. PATENT DOCUMENTS

| | | | | |
|---|---|---|---|---|
| 4,740,896 A | * | 4/1988 | Horiba et al. | 378/4 |
| 5,241,471 A | * | 8/1993 | Trousset et al. | 382/274 |
| 5,475,726 A | * | 12/1995 | Azevedo et al. | 378/4 |
| 6,263,096 B1 | * | 7/2001 | Boag et al. | 382/128 |
| 6,332,035 B1 | * | 12/2001 | Basu et al. | 382/128 |
| 6,483,890 B1 | * | 11/2002 | Malamud | 378/22 |
| 6,907,102 B1 | * | 6/2005 | Sauer et al. | 378/19 |
| 2004/0264625 A1 | * | 12/2004 | Basu et al. | 378/4 |

OTHER PUBLICATIONS

Prince et al., Hierarchical Reconstruction Using Geometry and Sinogram Restoration, IEEE Transactions on Image Processing, vol. 2, No. 3, Jul. 1993, pp. 401-416.*
PCT International Search Report, PCT/US2006/042392.
PCT Written Opinion of the International Searching Authority.
Michal Irani, Shmuel Peleg, Super Resolution From Image Sequences, 1990 IEEE, The Hebrew University of Jerusalem, Israel.
Sung Cheol Park, Min Kyu Park, Moon Gi Kang, Super-Resolution Image Reconstruction: A Technical Overview, IEEE Signal Processing Magazine, May 2003.

* cited by examiner

*Primary Examiner*—Edward J Glick
*Assistant Examiner*—Alexander H Taningco
(74) *Attorney, Agent, or Firm*—Quarles & Brady LLP (57) ABSTRACT

The resolution of an image produced by a CT imaging system is increased by employing an image reconstruction method that takes advantage of the redundant attenuation measurements made during a typical scan. An initial image is reconstructed with a filtered backprojection technique using the projection views acquired during the scan. Further images of higher resolution are produced by an iterative process in which the reconstructed image is reprojected, combined with originally acquired projection data, and backprojected again at the higher resolution.

24 Claims, 5 Drawing Sheets

METHOD FOR INCREASING THE RESOLUTION OF A CT IMAGE DURING IMAGE RECONSTRUCTION

CROSS REFERENCES TO RELATED APPLICATIONS

This application claims the benefit of U.S. Patent Application Ser. No. 60/732,753, filed Nov. 2, 2005 and titled "Method for increasing the resolution of a CT image during image reconstruction".

FIELD OF THE INVENTION

The present invention relates to computed tomography (CT) imaging apparatus; and more particularly, to image reconstruction methods.

BACKGROUND OF THE INVENTION

In a current computed tomography system, an x-ray source emits a fan-shaped beam which is collimated to lie within an X-Y plane of a Cartesian coordinate system, termed the "imaging plane." The x-ray beam passes through the object being imaged, such as a medical patient, and impinges upon an array of radiation detectors. The intensity of the transmitted radiation is dependent upon the attenuation of the x-ray beam by the object and each detector produces a separate electrical signal that is a measurement of the beam attenuation. The attenuation measurements from all the detectors are acquired separately to produce the transmission profile.

The source and detector array in a conventional CT system are rotated on a gantry within the imaging plane and around the object so that the angle at which the x-ray beam intersects the object constantly changes. A group of x-ray attenuation measurements from the detector array at a given angle is referred to as a "view" and a "scan" of the object comprises a set of views made at different angular orientations (θ) during one revolution of the x-ray source and detector. In a 2D scan, data is processed to construct an image that corresponds to a two dimensional slice taken through the object. The prevailing method for reconstructing an image from 2D data is referred to in the art as the filtered backprojection technique. This process converts the attenuation measurements from a scan into integers called "CT numbers" or "Hounsfield units", which are used to control the brightness of a corresponding pixel on a display.

The in-plane resolution of a CT image is determined by the sampling density of the x-ray projection views over the subject of the scan. More specifically, resolution is determined by the density of the projection view angles acquired during the scan and the sampling density of the detector elements in each acquired projection view. A number of techniques are known for increasing image resolution over that which is possible from a given detector array and a given number of acquired views. These include the so-called quarter-detector-shift scans and focal spot wobbling techniques, which both require hardware modifications to the CT systems.

Image resolution can be increased by reducing the size of the detector elements to increase detector resolution. Current systems employ detector elements that are 1 mm size and by using quarter-detector-shift and focal spot wobbling the image resolution may be increased to 0.5 mm in the in-plane dimensions. Detector elements can be manufactured to be smaller and to thus enable a higher density, higher resolution detector array to be constructed.

However, to maintain a sufficient image SNR, the x-ray dose must be increased and the cost of the detector array is significantly increased. As a result, there is a practical limit to increasing image resolution by reducing detector element size.

The same resolution limitations apply to three-dimensional CT. A 3D volume CT employs an x-ray source that emits a cone beam on a two-dimensional array of detector elements. Each acquired view is thus a 2D array of x-ray attenuation measurements and a complete scan is performed by acquiring multiple views as the x-ray source and detector array are revolved around the subject to produce a 3D array of attenuation measurements. Both the in-plane and axial resolution of the image that can be produced is determined by the detector resolution.

SUMMARY OF THE INVENTION

The present invention is an image reconstruction method that increases the resolution of an image that can be produced with a given CT system. The projection views acquired during a scan are backprojected on to an image grid of higher resolution than that supported by the sampling density of the scan. The resulting image is reprojected to produce not only the acquired attenuation data, but also additional, pseudo attenuation data that effectively samples acquisition space at a density greater than or equal to the original scan. This additional attenuation data is combined with the originally acquired attenuation data to reconstruct a higher resolution image than would otherwise be possible.

To satisfy the Nyquist criteria when using a filtered backprojection image reconstruction method redundant information is acquired. The present invention takes advantage of this unused information to produce pseudo attenuation measurements. These pseudo attenuation measurements are combined with the acquired attenuation measurements to produce an image of higher resolution. Both in-plane and axial resolution of an image can thus be increased without altering the CT system hardware.

DETAILED DESCRIPTION OF THE PREFERRED EMBODIMENT

Figure 1:
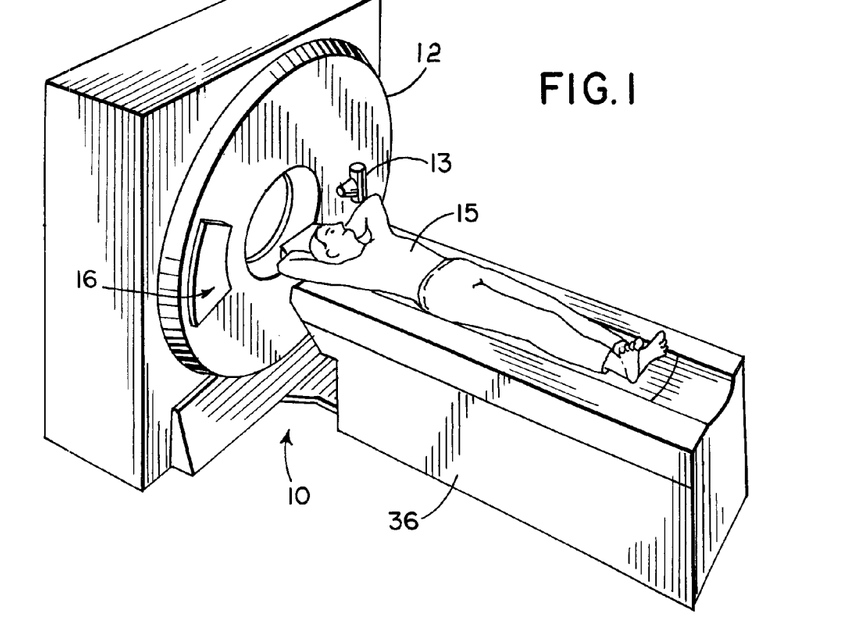
FIG. 1 is a pictorial view of a CT imaging system in which the present invention may be employed.
Figure 2:
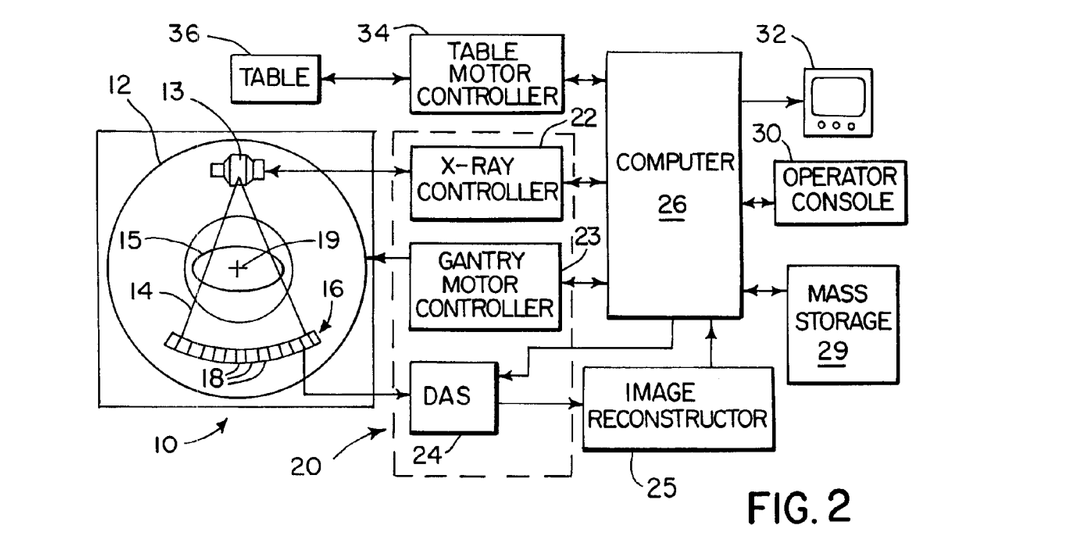
FIG. 2 is a block schematic diagram of the CT imaging system.

With initial reference to FIGS. 1 and 2, a computed tomography (CT) imaging system 10 includes a gantry 12 representative of a "third generation" CT scanner. Gantry 12 has an x-ray source 13 that projects a fan beam of x-rays 14 toward a detector array 16 on the opposite side of the gantry. The detector array 16 is formed by a number of detector elements 18 which together sense the projected x-rays that pass through a medical patient 15. Each detector element 18 produces an electrical signal that represents the intensity of an impinging x-ray beam and hence the attenuation of the beam as it passes through the patient. During a scan to acquire x-ray projection data, the gantry 12 and the components mounted thereon rotate about a center of rotation 19 located within the patient 15.

The rotation of the gantry and the operation of the x-ray source 13 are governed by al control mechanism 20 of the CT system. The control mechanism 20 includes an x-ray controller 22 that provides power and timing signals to the x-ray source 13 and a gantry motor controller 23 that controls the rotational speed and position of the gantry 12. A data acquisition system (DAS) 24 in the control mechanism 20 samples analog data from detector elements 18 and converts the data to digital signals for subsequent processing. An image reconstructor 25, receives sampled and digitized x-ray data from the DAS 24 and performs high speed image reconstruction according to the method of the present invention. The reconstructed image is applied as an input to a computer 26 which stores the image in a mass storage device 29.

The computer 26 also receives commands and scanning parameters from an operator via console 30 that has a keyboard. An associated display 32 allows the operator to observe the reconstructed image and other data from the computer 26. The operator supplied commands and parameters are used by the computer 26 to provide control signals and information to the DAS 24, the x-ray controller 22 and the gantry motor controller 23. In addition, computer 26 operates a table motor controller 34 which controls a motorized table 36 to position the patient 15 in the gantry 12.

Figure 3:
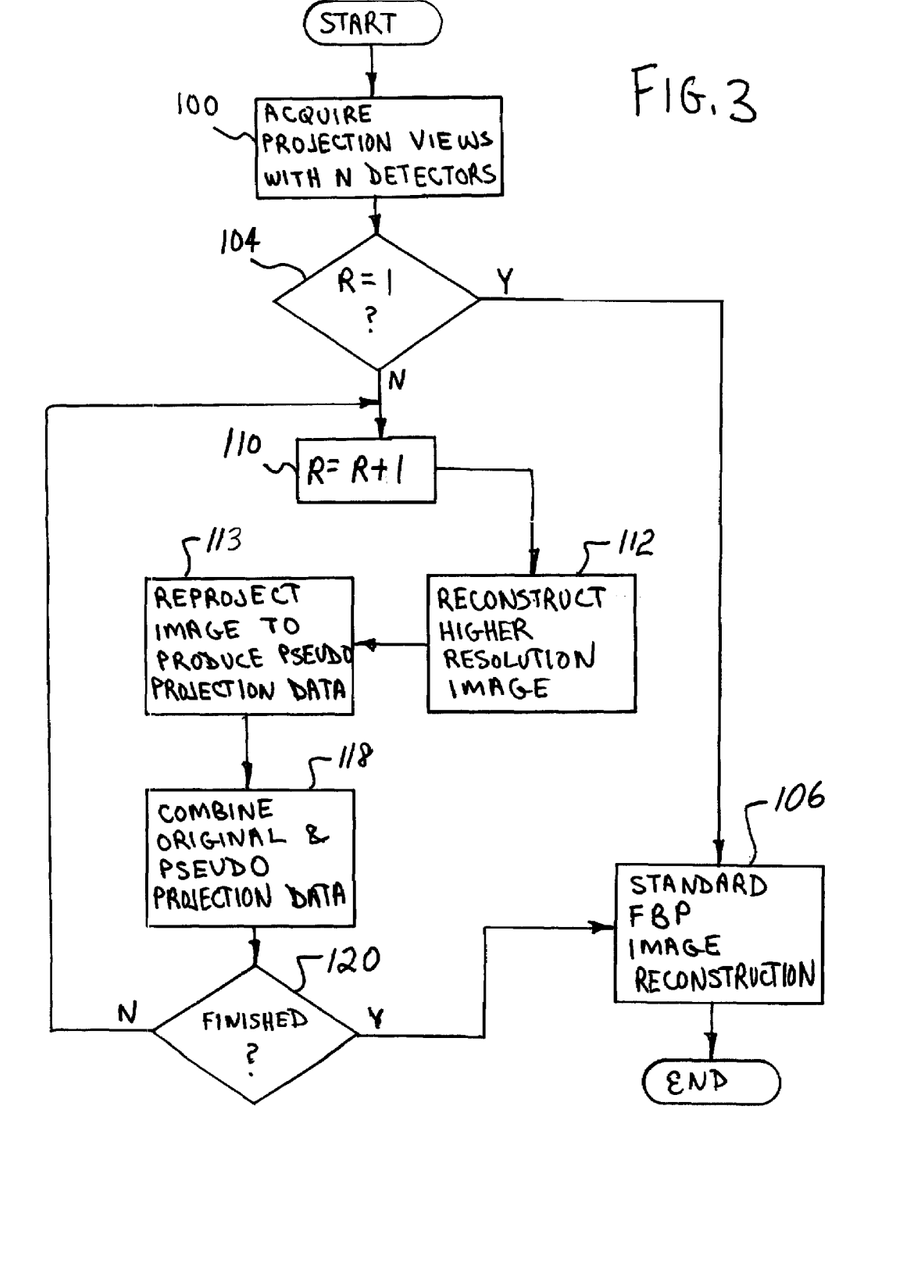
FIG. 3 is a flow chart which illustrates a preferred method for practicing the present invention with the CT system of FIG. 1.
Figure 4A:
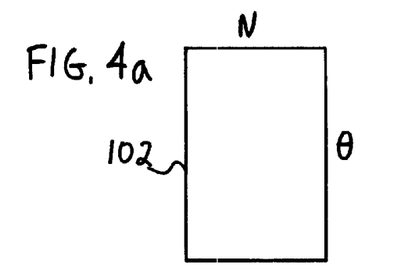
FIGS. 4a and 4b are pictorial representations of sinograms produced while practicing the method of FIG. 3.

Referring particularly to FIG. 3, the present invention is an improvement to a conventional image reconstruction process performed by the CT system. A conventional scan is performed in which the requisite number of projection views are acquired as indicated at process block 100. For example, a total of 984 projection views may be acquired over a range of view angles θ of 360 degrees. Each acquired projection view profile may have, for example, N=888 attenuation measurements made by N detector elements 18 in the detector array 16. The resulting array of Radon-space data 102 shown in FIG. 4a is referred to in the art as a sinogram.

The attenuation measurements made during a scan sample Radon space at a density determined primarily by the CT system hardware. The resulting sinogram will "support" the reconstruction of an image having a resolution that is below a resolution limit determined by the Radon space sampling density. While images can be reconstructed at a resolution that is above this supported limit, streaks and other artifacts will be produced which may limit their clinical usefulness.

As indicated at decision block 104 in FIG. 3 a resolution multiplier index R is initialized to a value of 1 and the scan prescription is checked to determine if image resolution is to be enhanced. If not, the present invention is not required and a conventional filtered backprojection image reconstruction is performed with the acquired projection views as indicated at process block 106. Other image reconstruction methods can be used, but regardless of the method used, the in-plane resolution of the reconstructed image will be limited to some value determined by the detector element size, spacing between the detector elements, and the number of projection views acquired. In the above acquisition the in-plane image resolution may be 1 mm by 1 mm, for example.

If a higher resolution image is required, the resolution multiplier index R is incremented as indicated at process block 110 and a corresponding higher resolution image is reconstructed as indicated by process block 112. A conventional filtered backprojection reconstruction method may be employed, but the resolution of the image is increased above the support limit. In the preferred embodiment the image resolution is doubled over that which would be reconstructed normally and image artifact; may, therefore, be present in the resulting undersampled image. In the above example, the in-plane resolution of this image would be 0.5 mm by 0.5 mm.

The next step as indicated by process block 113 is to reproject this higher resolution image. Reprojection is a well known process in which the image values along a ray path through the image are summed to form a projection value. As will be explained in more detail below, this reprojection step 113 can be done at the higher resolution with the result that the sinogram that is produced will contain more data and will sample Radon space more densely along one or more of its axes. The reprojection step can also be done at the same resolution as the resolution of the acquired projection view data but at different locations.

Figure 4B:
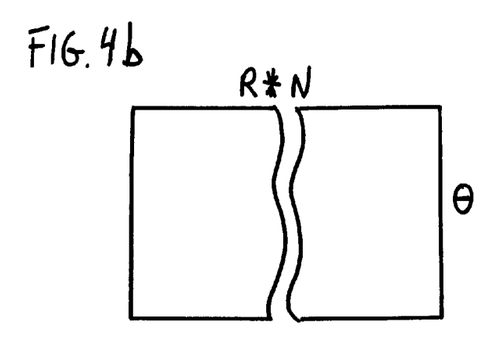
Figure 5:
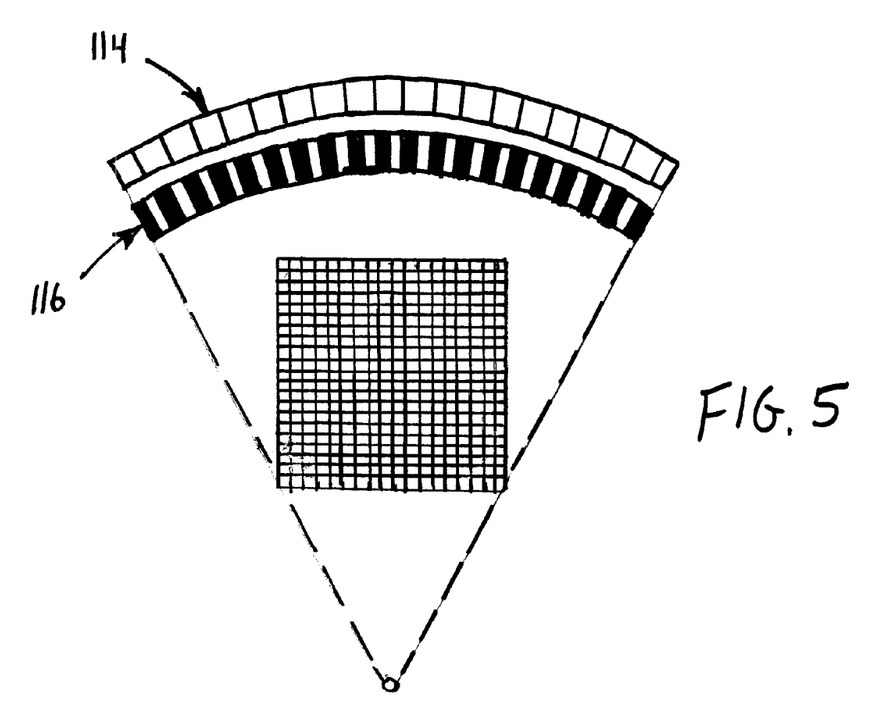
FIG. 5 is a pictorial representation of a reprojection step in the method of FIG. 3.

In the preferred embodiment the reprojection step is done at a higher resolution by doubling the number of ray paths in each projected fan beam to effectively double the detector elements in each reprojected fan beam view as illustrated in FIG. 5. Where the original fan beam projection view is acquired with N detector elements 18 indicated collectively at 114, the reprojected view will effectively have 2N detector elements indicated collectively at 116. Each view will include N original attenuation measurements plus the pseudo attenuation measurements created by the reprojection step 114. As a result, the size of the sinogram that is produced by the image reprojection step 113 is doubled along its detector axis as illustrated in FIG. 4b. Since the fan beam angle is unchanged by the reprojection, this doubling in size is effectively a doubling in sampling density along the detector axis of the sinogram.

The next step in the method as indicated at process block 118 is to combine the originally acquired attenuation measurements made by detector elements 18 with data from each reprojected view of the sinogram. Referring again to FIG. 5, in the case in which reprojection has occurred at a resolution two times that of the acquired projection data, every other attenuation value in the reprojected view 116 (e.g., the black bars) is replaced by the corresponding original attenuation measurement.

In a case in which reprojection occurs at the same resolution as that of the originally acquired projection views but at different locations, the two data sets are simply interleaved together (i.e., without replacing any values in the reprojected view 116).

In either case, a sinogram of increased size is produced which includes the originally acquired projection views combined with interleaved pseudo attenuation measurements produced according to the present invention.

As indicated at decision block 120, a determination is made next as to whether the image reconstruction process has been completed or whether a higher resolution image is required. This may be an automatic determination based on a prescribed image resolution input by the operator at the beginning of the scan, or it may be a manual determination based on observation of the reconstructed image that is displayed for the operator and/or attending physician.

If the resolution enhancement is completed, a standard image reconstruction is performed at process block 106 using the combined projection data in the sinogram produced at process block 118. This reconstruction is performed at the image resolution employed to reconstruct the image at process block 112. In the preferred embodiment this is R times the resolution of the original, unenhanced image. The resolution enhancement process can be repeated to further increase the resolution enhancement R in this final image if required.

Figure 6:
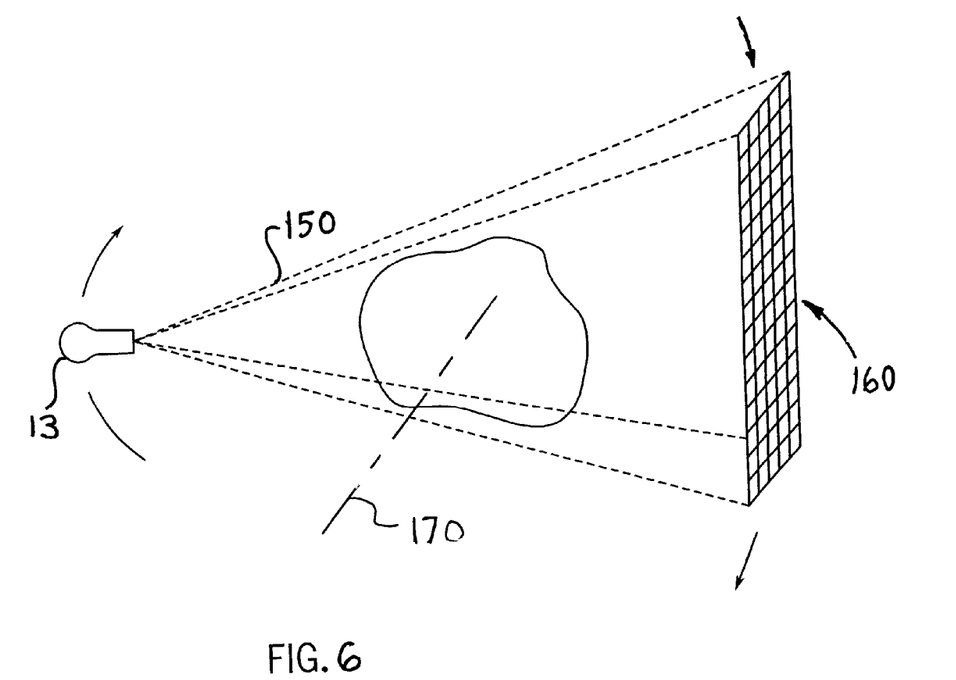
FIG. 6 is a pictorial representation of a 3D cone beam variation of the CT system of FIG. 1.

There are a number of variations that can be made to the preferred embodiment without departing from the spirit of the present invention. The present invention is applicable to 3D, or volume CT in addition to the 2D, fan beam embodiment described above. Referring to FIG. 6, in the 3D CT embodiment the x-ray source 13 produces a cone beam 150 and each projection view is acquired by a two-dimensional detector array 160. The x-ray source 13 and detector array 160 may be revolved around the subject of the examination to acquire the prescribed number of views, or they may be revolved and translated along the axis 170 in a well-known spiral scan.

The present invention may be used in 3D CT to not only increase the in-plane resolution of each acquired slice, but to also increase the resolution along the slice, or axial direction. Referring again to FIG. 3, the image reconstruction method used in process blocks 106 and 112 are different from that used in the 2D, fan beam embodiment described above, but any of the well known cone beam reconstruction methods can be used. The same is true of the reprojection step 113 which requires a more complicated 3D reprojection rather than a 2D reprojection.

Figure 4C:
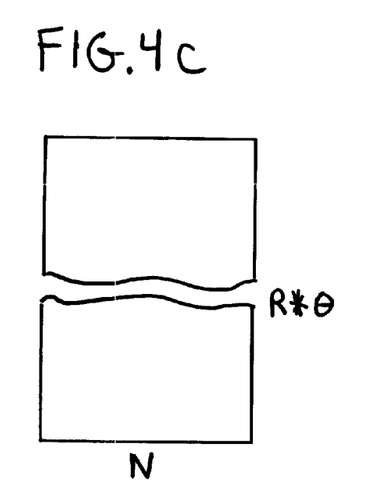

In the above-described embodiments of the invention the resolution is increased by producing pseudo attenuation measurements that effectively increase the resolution of the detector array. As shown in FIG. 4b, the number of attenuation measurements along the detector axis of the sinogram is increased by the resolution enhancement factor R (i.e., R*N). Image resolution can also be increased according to the present invention by effectively increasing the number of views acquired during the scan. Referring particularly to FIG. 3, the reprojection step 113 can be varied from the preferred embodiment described above by reprojecting R*θ views instead of the θ views that were acquired. The pseudo projection data in this embodiment is additional fan beam views and the reprojected sinogram is increased in size along its view angle axis as shown in FIG. 4c. The same standard FBP image construction step 106 is performed to produce the final higher resolution image, but more views are available to be backprojected.

It should also be apparent that the present invention may be employed to produce pseudo attenuation data that effectively increases both the detector array resolution (N) and the number of views (θ). Referring to FIG. 3, this can be done in a single iteration at the reprojection step 113 where additional views are reprojected and additional rays are reprojected in each view. Or, additional rays can be reprojected in one iteration through the process and additional views can be reprojected in the next iteration.

Yet another embodiment of the present invention is to combine the reconstruction and forward projection process into a single process. Note that the first produced image can be obtained by filtering and backprojecting the measured projection samples. The forward projection takes the results to generate the pseudo projection samples. The filtering, backprojecting, and forward projection steps can be combined to form a single step. This can be accomplished either by re-deriving the entire mathematical formula in the cone beam case or by implementing these steps numerically. The advantage of this approach is to reduce the "error" in the final forward projection. For example, in the image generation process, instead of generating image data on a Cartesian coordinate, image data are generated at the location of the fan rays. In this case the forward projection process is simply an addition operation, instead of an interpolation process. This should improve the accuracy of the forward projection.

Note also that an additional step can be performed in the forward projection process to further reduce the degradation produced by the interpolation. The response function of the interpolation is known and therefore, in the forward projection step, addition "deconvolution" can be performed to compensate for the degradation in the interpolation process.

While a conventional filtered backprojection (FBP) image reconstruction method is employed in the preferred embodiment described above, other reconstruction methods may also be employed in steps 112 and 106. For example, the image reconstruction method described in U.S. Provisional Pat. Appln. Ser. No. 60/716,865 filed on Sep. 14, 2005 and entitled "Backprojection Reconstruction Method For CT Imaging" may be employed in certain clinical applications or the improved divergent beam image reconstruction method described in co-pending U.S. patent application Ser. No. 10/861,579 filed on Jun. 4, 2004 and entitled "A Fourier Space Tomographic Image Reconstruction Method" may be used.

The present invention may also be used with other imaging modalities such as MRI/MRA, SPECT, PET and PET/CT. The improvement in image quality that may be achieved is a function of the quality of the image that can be reconstructed from the originally acquired projection data. In the case of MR images acquired with projection reconstruction methods such as that described in U.S. Pat. Nos. 6,487,435 and 6,630,828, the quality of the acquired images is high and the present invention can be employed to significantly improve MR image reconstruction. On the other hand, PET images are lower in quality and the improvement achieved with the present invention is much less.

The invention claimed is:

1. A method for producing an image from projection views acquired with an imaging system, the steps comprising:
    a) acquiring a plurality of projection views of a subject with the imaging system to form an acquisition-space data set of a selected sampling density;
    b) reconstructing an image from the acquisition-space data set at a resolution higher than that supported by the selected sampling density;
    c) producing another acquisition-space data set of pseudo data by transforming the reconstructed higher resolution image, the another acquisition-space data set having a sampling density along one or more of its axes that is greater than or equal to the acquired acquisition-space data set;
    d) producing a combined acquisition-space data set by combining acquired data from the acquisition-space data set with at least a portion of said another acquisition-space data set; and
    e) reconstructing the image from the combined acquisition-space data set produced in step d).

2. The method as recited in claim 1 in which the combined acquisition-space data set is produced by substituting the acquired data from the acquisition-space data set into corresponding locations in said another acquisition-space data set.

3. The method as recited in claim 1 in which the combined acquisition-space data set is produced by interleaving the acquired data from the acquisition-space data set with the pseudo data from the another acquisition-space data set.

4. The method as recited in claim 1 in which the acquisition-space data set is a sinogram comprised of a plurality of projection views acquired at a plurality of successive view angles, and each projection view is comprised of a plurality of measurements.

5. The method as recited in claim 4 in which the another acquisition-space data set has a larger number of measurements in each projection view.

6. The method as recited in claim 4 in which step b) is accomplished using a backprojection method and step c) is accomplished by using a reprojection method.

7. The method as recited in claim 1 in which steps c), d) and e) are repeated to increase further the resolution of the reconstructed image.

8. A method for producing an image with an imaging system, the steps comprising:
   a) acquiring a set of projection views with the imaging system to form a first sinogram in which one dimension indicates a view angle and a second dimension indicates a view sample;
   b) reconstructing a first image from the sinogram, the first image having a resolution in real space that is greater than the resolution supported by the sampling density of the first sinogram;
   c) reprojecting the first image to produce a second sinogram containing pseudo data;
   d) combining the projection views in the first sinogram with the pseudo data in the second sinogram to form a third sinogram; and
   e) reconstructing the image from the third sinogram, the image having a resolution in real space that is greater than the resolution supported by the first sinogram.

9. The method as recited in claim 8 in which steps b) and e) are performed by a filtered backprojection.

10. The method as recited in claim 9 in which the imaging system is an x-ray CT system.

11. The method as recited in claim 10 in which each projection view is acquired with a fan beam of x-rays.

12. The method as recited in claim 10 in which each projection view is acquired with a cone beam of x-rays.

13. The method as recited in claim 8 in which steps b) through d) are repeated before performing step e) and the third sinogram replaces the first sinogram during the repetition to produce another third sinogram which is employed by step e).

14. The method as recited in claim 8 in which the second sinogram in step c) is increased in size by reprojecting additional views.

15. The method as recited in claim 8 in which the second sinogram is increased in size in step c) by reprojecting additional view samples in each view.

16. A method for producing an image from projection views acquired with an imaging system, the steps comprising:
   a) acquiring a plurality of projection views of a subject with the imaging system to form a multi-axis, acquisition-space data set of a selected sampling density;
   b) producing from the acquired projection views another multi-axis, acquisition-space data set having a sampling density along at least one axis that is greater than the selected sampling density of the acquired acquisition-space data set;
   c) producing a combined acquisition-space data set by combining acquired data from the acquisition-space data set with data from said another acquisition-space data set; and
   d) reconstructing the image from the combined acquisition-space data set produced in step c).

17. The method as recited in claim 16 in which the combined acquisition-space data set is produced by substituting acquired data from the acquisition-space data set into corresponding locations in said another acquisition-space data set.

18. The method as recited in claim 16 in which the combined acquisition-space data set is produced by interleaving the acquired data from the acquisition-space data set with the data from the another acquisition-space data set.

19. The method as recited in claim 16 in which the acquisition-space data set is a sinogram comprised of a plurality of projection views acquired at a plurality of successive view angles, and each projection view is comprised of a plurality of measurements.

20. The method as recited in claim 19 in which the another acquisition-space data set has a larger number of measurements in each projection view.

21. The method as recited in claim 19 in which step b) is accomplished using a backprojection method followed by a reprojection method.

22. The method as recited in claim 16 in which the imaging system is an x-ray CT system.

23. The method as recited in claim 22 in which each projection view is acquired with a fan beam of x-rays.

24. The method as recited in claim 22 in which each projection view is acquired with a cone beam of x-rays.

* * * * *

UNITED STATES PATENT AND TRADEMARK OFFICE
CERTIFICATE OF CORRECTION

PATENT NO. : 7,602,879 B2
APPLICATION NO. : 11/535657
DATED : October 13, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 265 days.

Signed and Sealed this

Fifth Day of October, 2010

David J. Kappos
*Director of the United States Patent and Trademark Office*